United States Patent [19]

Smyth

[11] 4,333,446

[45] Jun. 8, 1982

[54] SOLAR CONCENTRATOR

[75] Inventor: Jerry S. Smyth, Huntington Twp., Huntington County, Ind.

[73] Assignee: Smyth Aerodynamics, Inc., Huntington, Ind.

[21] Appl. No.: 150,524

[22] Filed: May 16, 1980

[51] Int. Cl.³ ............................................. F24J 3/02
[52] U.S. Cl. .................................. 126/438; 126/425; 350/292; 350/293
[58] Field of Search ............... 126/439, 438, 440, 450, 126/443, 442, 451, 424, 425; 350/293, 298, 292, 299; 353/3

[56] References Cited

U.S. PATENT DOCUMENTS

| 787,145 | 4/1905 | Brown | 126/438 |
|---|---|---|---|
| 4,171,876 | 10/1979 | Wood | 126/438 |
| 4,256,088 | 3/1981 | Vindum | 126/438 |

FOREIGN PATENT DOCUMENTS

| 2755722 | 6/1979 | Fed. Rep. of Germany | 126/424 |
|---|---|---|---|
| 2257067 | 8/1975 | France | 126/424 |

Primary Examiner—James C. Yeung
Attorney, Agent, or Firm—Blanchard, Flynn, Thiel, Boutell & Tanis

[57] ABSTRACT

A solar concentrator having an open framework formed as a geodesic dome. A rotatable support axle extends substantially diametrically across the dome and has the opposite ends thereof supported on the framework. The support axle defines a first rotational axis which is oriented to extend substantially parallel with the earth's North-South axis. A support post is hingedly mounted on the support shaft substantially at the midpoint thereof for permitting angular displacement of the support post relative to the support shaft about a second rotational axis which is perpendicular to the first axis. A dishshaped reflector assembly is positioned within the interior of the framework and fixedly secured to the support post. First and second drives effect angular displacement of the reflector assembly about the first and second axes, respectively, to permit tracking of the solar position.

10 Claims, 9 Drawing Figures

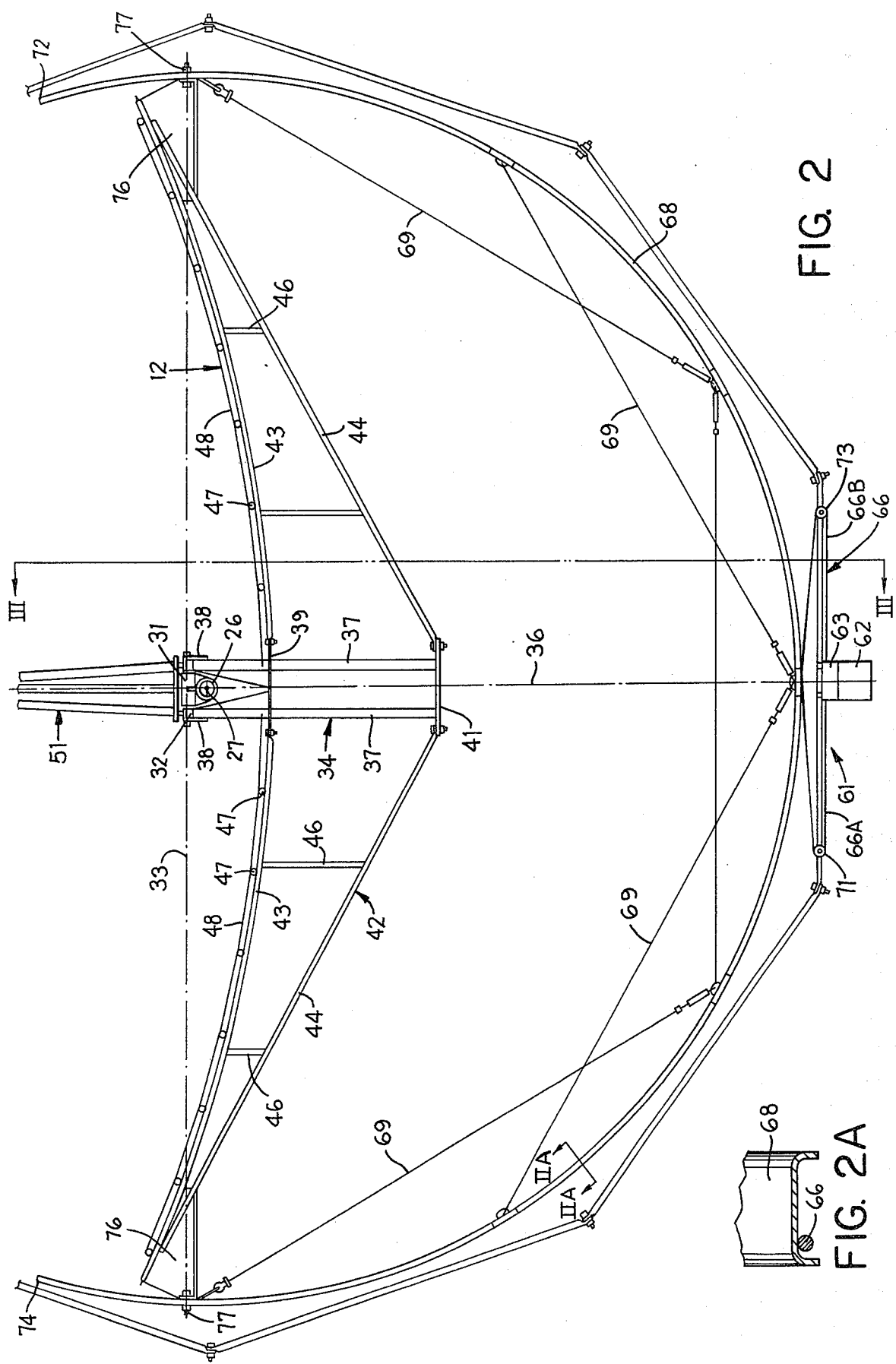

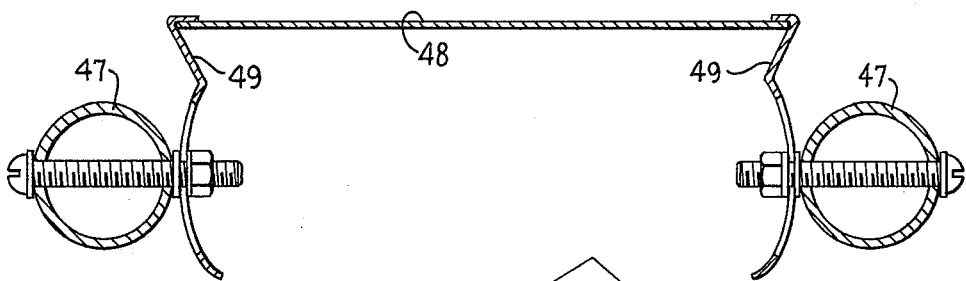
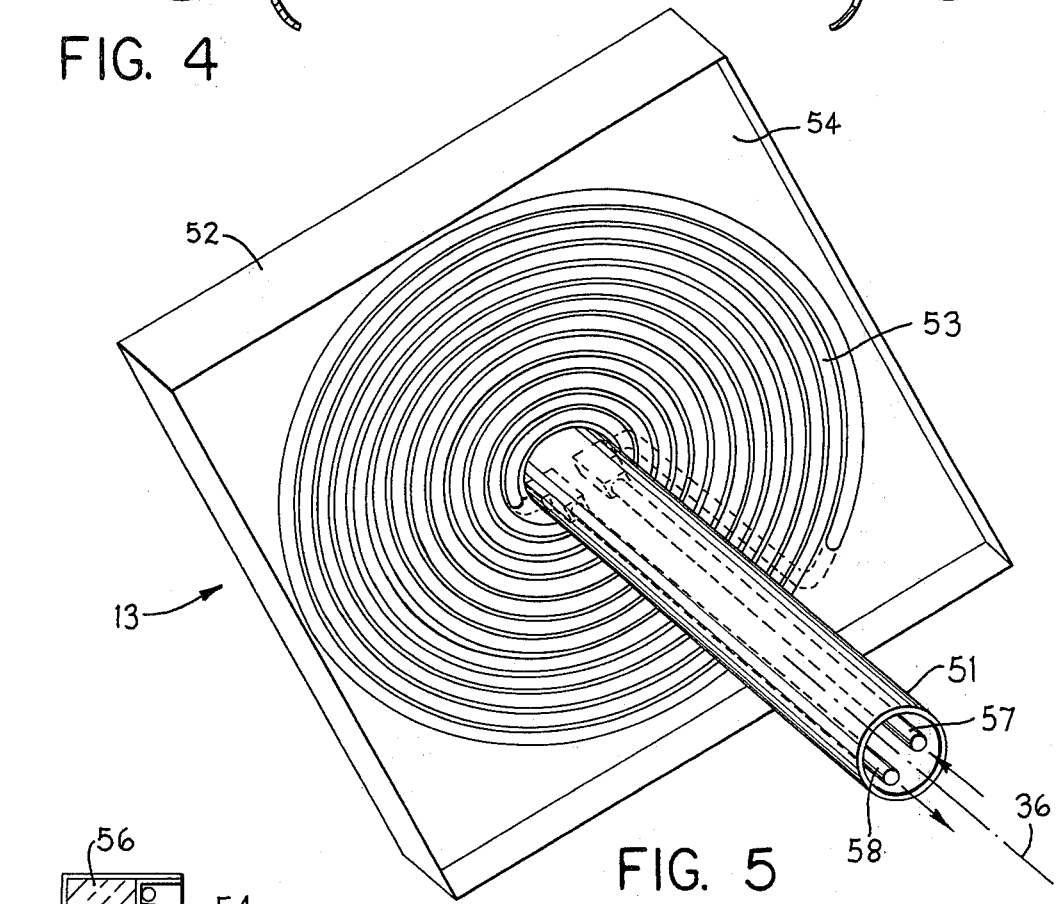
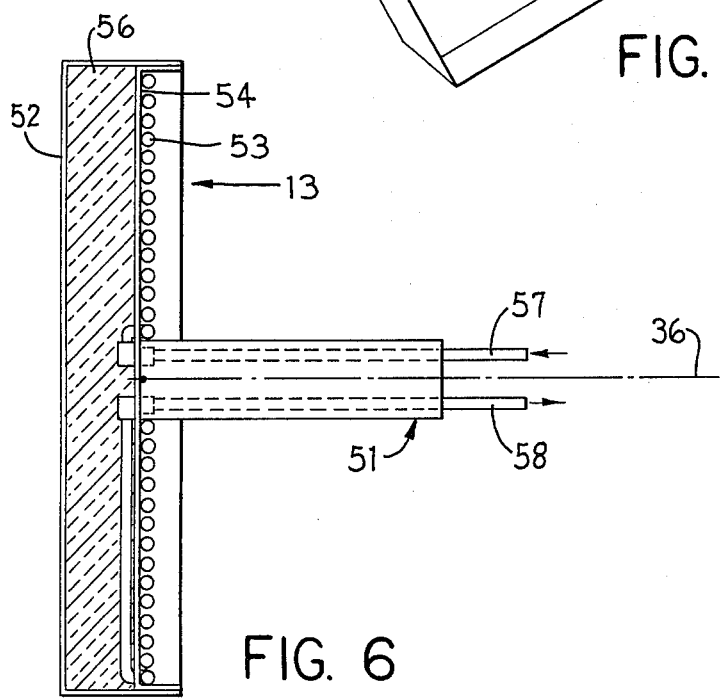

SOLAR CONCENTRATOR

FIELD OF THE INVENTION

This invention relates to a tracking-type device for concentrating and collecting solar energy to permit effective utilization of same, such as for heating a flowable material or fluid.

BACKGROUND OF THE INVENTION

Numerous solar collectors have been devised, many of which are of the tracking type to enable the collector to remain substantially perpendicular to the solar position by selectively altering its orientation in response to the solar position. Some of these known devices compensate for the compound movement of the sun, daily from horizon to horizon, and seasonally by means of a progressive elevational change. For this purpose, various controls are utilized, such as solar cells or other photovoltaic devices, or clock mechanisms, to control the tracking movement and hence orientation of the reflector or concentrator. While most known solar concentrators operate fairly satisfactorily with respect to their capability of concentrating and collecting solar energy, nevertheless many of these devices are extremely complex and cumbersome with respect to the structure and hardware involved. More specifically, in order to provide a reflector or concentrator of rather large size so as to permit effective collection of substantial solar energy, such concentrators are often divided into several portions which are individually movable, which thus greatly increases the drives and controls required for the overall assembly. In the alternative, the rather large concentrators are often fixed or have only limited movement variety, and this in turn additionally restricts the effectiveness of the concentrator. When an attempt is made to provide a large reflector with the capability of both daily and seasonal tracking movement, then the resulting support structure generally becomes extremely complex, costly and cumbersome, whereby the resulting solar device is of prohibitive cost, and is also of undesirable size and creates an unsightly appearance.

Accordingly, it is an object of the present invention to provide an improved solar concentrator which effectively overcomes many of the undesirable advantages associated with prior such devices, and which still permits suitable tracking, both daily and annually, so as to maintain the concentrator in the desired relationship relative to the solar position. More specifically, it is an object of this invention to provide an improved solar concentrator, as aforesaid, which permits utilization of a rather large reflector or mirror array formed substantially of a parabolic configuration to permit efficient concentration and collection of solar energy, which mirror array is suitably movably supported so as to undergo the desired daily horizon-to-horizon tracking of the solar position, and which can also be suitably angularly adjusted to compensate for seasonal elevational changes in the solar position. At the same time, the mirror array or reflector in the improved concentrator of this invention, even though of substantial size, is supported by an improved frame structure, specifically an open geodesic dome or shell having the mirror array movably disposed therein, so that the resulting solar concentrator thus possesses substantial strength and rigidity while utilizing a supporting frame which possesses minimum structural complexity, which can be manufactured and assembled in a simple, efficient and rather inexpensive manner, which provides the necessary strength and rigidity to withstand environmental forces while still additionally permitting the mirror array to be movably supported as desired, and which is considered more aesthetically acceptable than many of the prior devices. This improved solar concentrator, in addition to incorporating the desirable structural and functional advantages explained above, additionally enables very efficient and effective concentration of the solar energy to permit efficient utilization thereof, and additionally enables the mirror array to effectively track or follow the solar movement in a simple and efficient manner so as to permit the desired efficiency in the collection of solar energy.

Other objects and purposes of the invention will be apparent to persons familiar with devices of this general type upon reading the following specification and inspecting the accompanying drawings.

In the solar concentrator of this invention, there is provided a support frame formed substantially as a geodesic dome, which dome effectively comprises an open ball-like framework formed by a plurality of interconnected triangles, each triangle being formed by three elongated rodlike struts. A gridlike support is movably disposed within the geodesic dome and mounts thereon an array of mirrors which define a substantially parabolic reflecting and concentrating surface. The support grid has a mast fixed thereto and projecting outwardly from the mirror array substantially along the axis of generation of the parabolic surface. A target is mounted at the free end of the mast, normally in the vicinity of the focal point of the mirror array, for collecting the solar energy. The target, in a preferred embodiment, employs a spirally wound coil having a fluid flowing therethrough. The mirror array is hingedly supported for limited angular displacement about a first axis which extends substantially diametrically of the dome for permitting the mirror array to be angularly displaced to compensate for seasonal elevational changes in the position of the sun. The mirror array is also movably supported for angular displacement about a second axis which also extends diametrically of the dome and is substantially perpendicular to, and approximately intersects, the first axis. The mirror array is angularly displaced through a substantial angular extent about this second axis to permit daily tracking of the sun from horizon to horizon. A pair of drive mechanisms, suitably controlled by a control system employing both phototransistors and a timer, are provided for individually controlling the angular displacement of the mirror array about the first and second axes. The second axis is defined by an elongated polar shaft which extends diametrically across the dome and is suitably rotatably supported thereby. The gridlike frame for the mirror array is in turn hingedly supported on the polar shaft by a bearing arrangement located substantially at the midpoint thereof, which midpoint also effectively defines the midpoint of the dome, for additionally permitting the mirror array to be angularly displaced about said first axis.

BRIEF DESCRIPTION OF THE DRAWINGS

The presently contemplated preferred embodiment of the invention is illustrated by the attached drawings, wherein:

FIG. 2 is a fragmentary enlarged view taken substantially along a central of diametral plane which passes through the midpoint of the polar axis and is perpendicular thereto;

FIG. 2A is an enlarged, fragmentary sectional view along line IIA—IIA in FIG. 2;

FIG. 4 is a sectional view illustrating the manner in which the mirror panels are mounted on the support grid;

FIG. 5 is a perspective view illustrating the target;

FIG. 6 is a central sectional view of the target illustrated by FIG. 5; and

Figure 1:
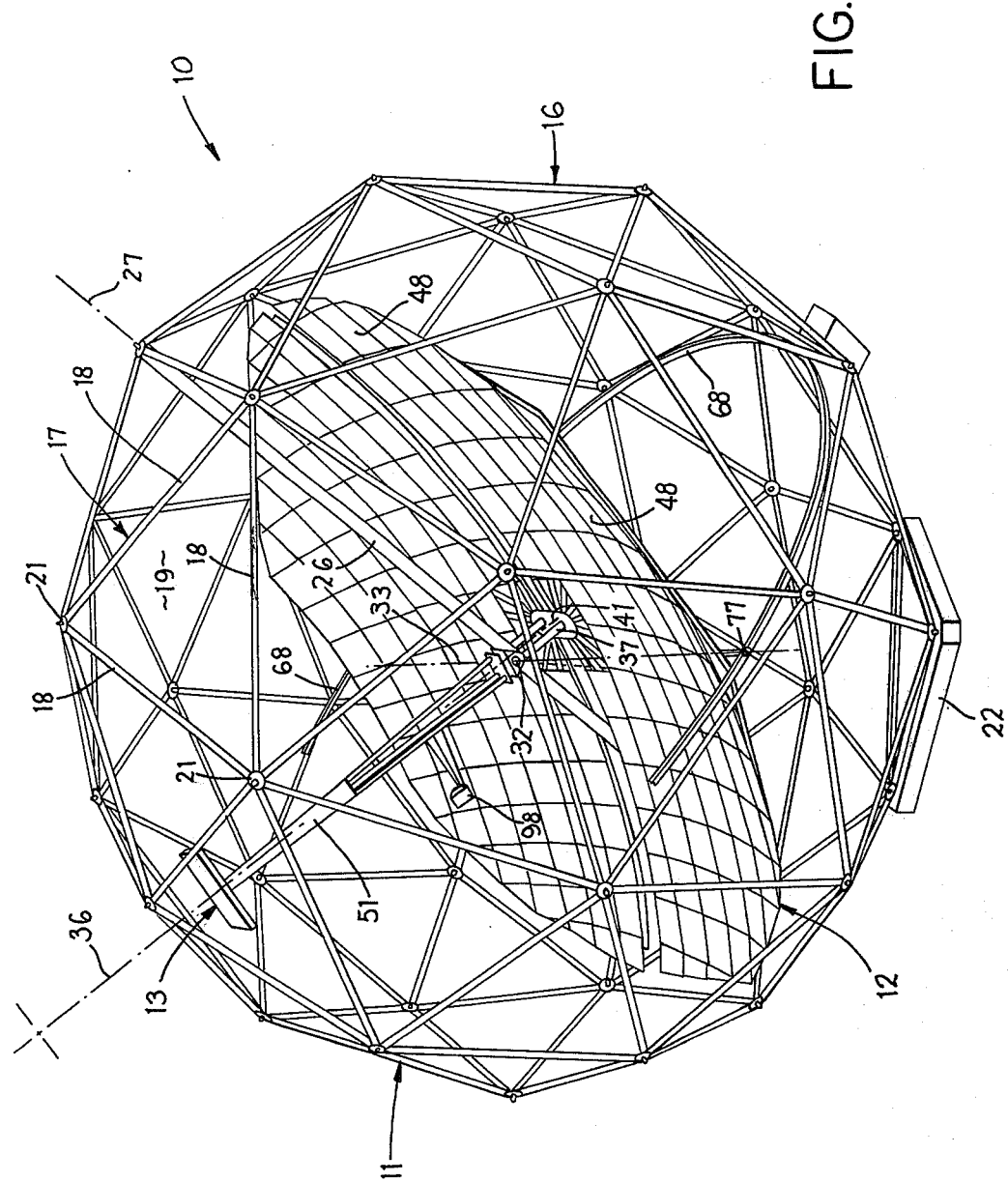
FIG. 1 is a perspective view of a solar concentrator according to this invention.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the device and designated parts thereof. Said terminology will include the words specifically mentioned, derivatives thereof, and words of similar import.

DETAILED DESCRIPTION

Referring to the attached drawings, and particularly FIG. 1, there is illustrated a tracking-type solar energy concentrating device 10 according to the present invention. This device includes a stationary frame 11 which supports therein a movable reflector assembly 12, the latter having a target assembly 13 associated therewith. A suitable control system 14 (FIG. 7) is provided for controlling the movement of the reflector assembly 12 so as to enable it to track the sun's position.

The frame 11 is formed as a geodesic dome or shell 16, and thus has a configuration which resembles a sphere. The geodesic dome or shell 16, as is known from mathematical principles which define a geodesic structure, is formed in its entirety from a plurality of structural triangles 17, each said triangle 17 being formed from three rodlike elements or struts 18 such that the central area 19 of each triangle is totally open. The strut 18 of each triangle effectively functions as a common side for two adjacent triangles such that each triangle borders on and has sides common with three directly adjacent triangles. Further, the triangles, and specifically the rodlike struts 18 of the triangles, and rigidly joined together at the individual apex points 21 by suitable structure, such as threaded fasteners.

Figure 2B:
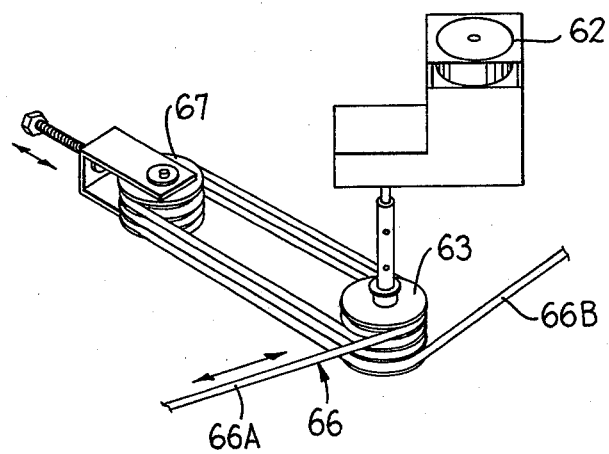
FIG. 2B is an enlarged fragmentary perspective view illustrating the drive arrangement for the daily drive.

The geodesic dome or shell 16 is preferably designed so as to be an even frequency icosahedron since this thus results in the dome having a great circle (i.e., a planar diametrical circle) at the equator which is formed by a continuous series of rigidly joined struts 18 substantially as illustrated by FIG. 2. In addition, this geodesic dome has all of the triangles thereof formed as isosceles triangles (some of which are also equilateral triangles). In a preferred embodiment, the selected geodesic dome structure results in five adjacent triangles 17 being disposed so as to have a common apex 21. These relationships greatly simplify the structure of the dome inasmuch as it is formed substantially entirely by the struts 18, and only a limited number of different length struts need by provided. For example, the dome 16 constructed as a two frequency icosahedron can be constructed from struts of only two lengths, requiring only 120 struts. The resulting dome or shell 16 is thus totally open except for the extremely small areas and volumes occupied by the elongated struts 18.

To securely mount the dome 16, the lower vertices of appropriate triangle or triangles are used as mounting points. This thus enables the dome to be fixedly secured, such as to a suitable stationary support 22. Additional guy wires (not shown) are also preferably provided and positioned exteriorly of the dome for securely anchoring same relative to the ground.

The dome 16 rotatably supports thereon a shaft 26, hereinafter referred to as the polar axle, the rotational axis 27 of which extends substantially diametrically across the interior of the dome. A pair of suitable stub shafts 28 are provided at a pair of diametrically opposite apexes 22, and suitable bearings 29 coact between these stub shafts 28 and the polar axle 26 for rotatably supporting the latter. The polar axis 27 is oriented so as to be substantially parallel with the earth's North-South axis of rotation.

The polar axle 26 has, at the midpoint thereof, a bearing sleeve 31 fixedly mounted thereon, which sleeve rotatably supports a hinge shaft 32, the rotational axis 33 of which defines the annual or declination axis. This annual axis 33 extends diametrically of the dome in perpendicular relationship to the polar axis 27. These axes 27 and 33 theoretically intersect one another substantially at the midpoint or center of the dome, although the axes can be slightly laterally spaced apart (as in the illustrated embodiment) so as to simplify the overall construction of the assembly without interfering with the operation or efficiency of the reflector assembly.

Figure 3:
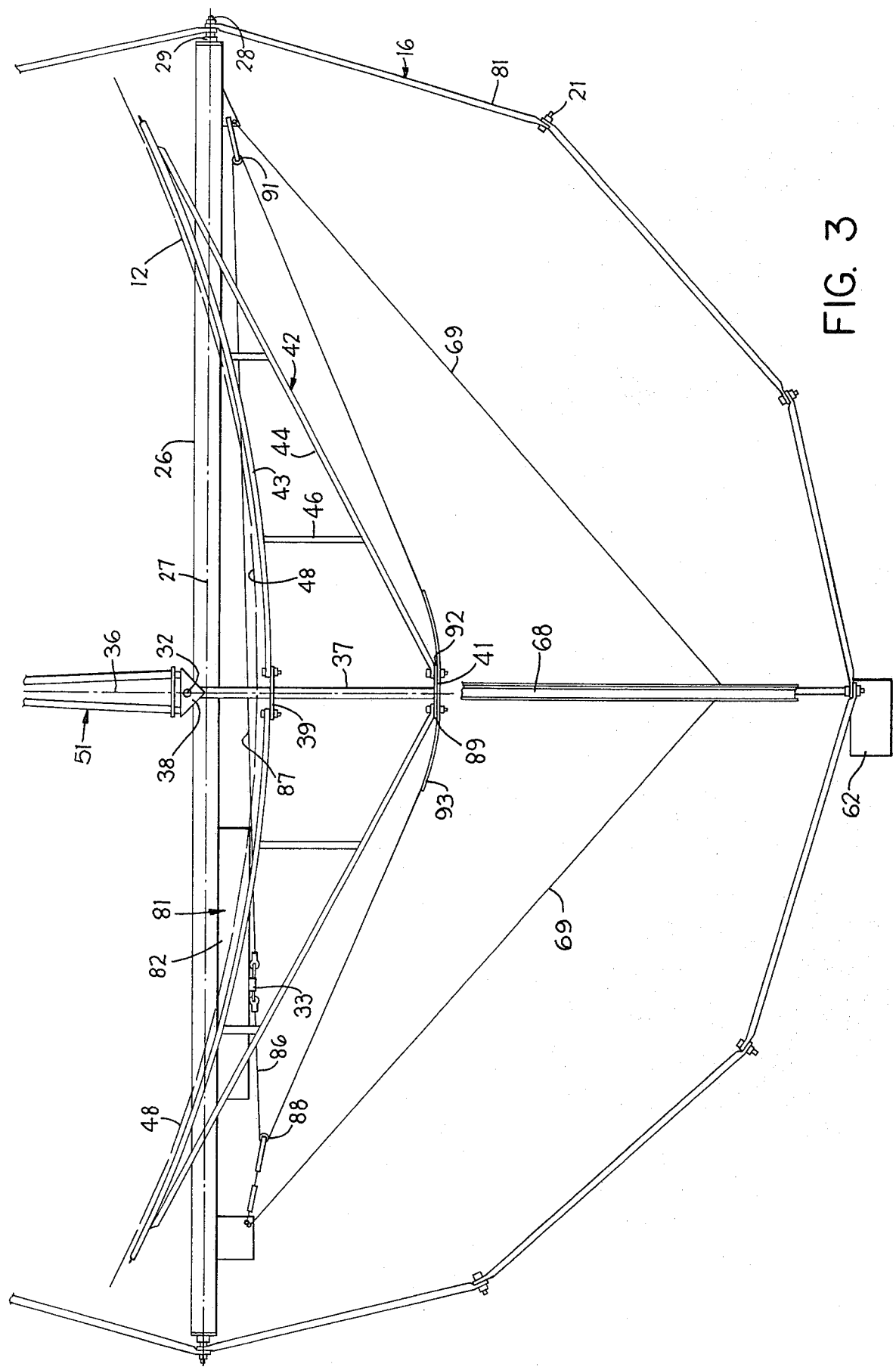
FIG. 3 is a fragmentary view similar to FIG. 2, being taken substantially along line III—III in FIG. 2.

The hinge shaft 32 supports an elongated central support column 34, which column extends with its longitudinally extending axis 36 disposed so as to be substantially perpendicular to the axis 33. This longitudinal axis 36 is also disposed within a plane which contains therein the polar axis 27, with the longitudinal axis 36 being substantially perpendicular to the polar axis 27 when the reflector assembly is in its center or straight-up position as illustrated by FIG. 3. The central support column 34 is, in the illustrated embodiment, formed by a pair of elongated and substantially parallel tubes 37 provided with brackets 38 at the upper ends thereof for connection to the hinge shaft 32. Suitable upper and lower mounting plates 39 and 41, respectively, are fixedly joined to these tubes 37.

The central support column 34, which is a part of the reflector assembly 12, supports thereon a dishlike grid or support frame 42 which includes a plurality of spar assemblies which project radially outwardly from the central support column. Each spar assembly includes a top spar 43 which projects radially outwardly and has its inner end fixedly secured to the top mounting plate 39, and a lower or bottom spar 44 which projects radially outwardly and has its inner end fixed to the lower mounting plate 41. These top and bottom spars are suitably rigidly joined together by connecting struts 46. In addition, the radially outer ends of the top and bottom spars 43 and 44, respectively, are suitably rigidly joined together, such as by welding.

The aforementioned spars in turn support thereon a plurality of elongated grid rods 47, which latter rods are disposed in direct engagement with the upper surfaces of the top spars 43, the grid rods 47 being disposed in spaced but substantially parallel relationship. These grid rods 47 are provided so as to permit a plurality of individually planar mirrors or reflectors 48 to be supported thereon, the individual mirrors being supported by being resiliently grippingly held between a pair of opposed clips 49 (FIG. 4) which are suitably secured to an adjacent pair of grid rods 47. The dishlike shape or configuration of the support frame 42 results in the array of mirrors 48 having a substantially parabolic configuration, the axis of which is substantially coincident with the aforesaid longitudinal axis 36. Further, the parabolic configuration of the array of mirrors 48 is effectively generated about a focal point which lies on an extension of this axis 36, which focal point is preferably located in the vicinity of or spaced slightly outwardly from the target assembly 13.

The aforementioned target assembly 13 is rigidly secured with respect to the reflector assembly 12, and for this purpose there is provided a rigid elongated mast 51 which effectively constitutes an extension of the central support column 34. This mast projects outwardly away from the mirror array 48 substantially along the axis 36 and has the target assembly 13 mounted thereon substantially adjacent the free end of the mast so that the target assembly is positioned within the dome 16 but can be swingably displaced relative thereto. As illustrated by FIG. 5, the target assembly 13 in a preferred embodiment is formed by a stationary support 52 which is secured to the end of the mast 51. An energy collector or target 53 is mounted on this support 52, which collector 53 in the illustrated embodiment comprises a spirally wound coil (such as copper or steel conduit) containing therein a flowable heat-transfer fluid such as water or oil. This spirally wound conduit 53, which is substantially concentric with the mast 51, is positioned directly adjacent a heat absorbing face plate 54, the latter being suitably backed by appropriate insulation 56. Suitable supply and return pipes 57 and 58, respectively, extend longitudinally along the mast and are joined to opposite ends of the spirally wound coil 53 for permitting the heat-transfer fluid to be appropriately circulated through the coil. The pipes 57 and 58 have their inner ends positioned adjacent the polar axle, at which point the pipes are joined through suitable flexible connectors to a suitable fluid circulation system located externally of the concentrating device, which external circulating system includes an appropriate pump (not shown) for effecting the desired forced circulation of the fluid through the system and through the target coil 53. Such fluid piping and circulating systems are well known, so that further description of same is believed unnecessary.

To effect the desired angular displacement of the reflector and target assemblies so as to follow the daily movement of the sun, there is provided a first drive mechanism 61 for effecting angular displacement of the target and reflector assemblies about the polar axis 27. This drive mechanism 61 includes a conventional reversible electric drive motor 62 which is stationarily mounted on the dome 16. In the illustrated embodiment, this motor 62 is positioned outwardly from the underside of the reflector assembly at a location approximately aligned with the axis 36 when the mast is in its upright position. This drive motor 62 has a rotatable drive pulley 63 associated with the output shaft thereof, which pulley drivingly engages an intermediate portion of an elongated flexible drive cable 66. This cable 66, which winds around the pulley 63, also winds around an adjacent idler pulley 67 which is suitably adjustable toward or away from the drive pulley 63 so as to permit tension adjustment of the drive cable 66. The end portions 66A and 66B of the drive cable 66 extend away from the drive pulley 63 in substantially opposite directions so that, during pulley rotation, one end portion 66A will be effectively shortened simultaneous with lengthening of the other end portion 66B, and vice versa when the drive pulley 63 is reversely rotated.

The drive cable 66 is suitably interconnected to an intermediate drive member 68, which latter member is effectively formed as a portion of a ring or hoop. The intermediate drive member 68, as illustrated by FIG. 2, preferably extends through an angular extent of more than 180°, such as through an angular extent of at least about 220° to thereby enable the reflector assembly to be daily angularly displaced through an angular extent of approximately 220°, if necessary. This enables the reflector and target assemblies to thus be angularly displaced approximately 110° in either direction from the central upright position. The intermediate drive member 68, which is formed of a substantially constant circular radius, is formed so as to lie on a radius which is slightly smaller than the dome or shell 16 so that the drive member 68 can thus be angularly or rotatably displaced relative to the shell, substantially about the polar axis 27. The drive member 68 lies in a diametral plane which contains therein the annual axis 33, which plane also extends perpendicularly with respect to the polar axis 27. A plurality of conventional guy wires 69 are provided for joining various portions of the drive member 68 together so as to provide this drive member with the required support and strength while enabling the desired driving rotation thereof.

To effect driving rotation of member 68, the end portion 66A of drive cable 66 extends from the drive pulley 63 and wraps around a suitable guide pulley 71, from which the cable portion 66A then extends inwardly into contact with the exterior arcuate periphery of the drive member 68, the cable portion 66A extending along the periphery of the member 68 such that one free end of the cable 66 is suitably anchored, as at the anchor point 72, to the drive member 68 adjacent one free end thereof. The other end portion 66B of drive cable 66 similarly extends around a further guide pulley 73 and then is guided in the opposite direction along the exterior of the drive member 68 so that the other free end of cable 66 is anchored to drive member 68 at point 74. The drive member itself is preferably formed from an elongated channel-like element which opens radially outwardly to permit effective guiding of the cable 66 therein, as diagrammatically illustrated by FIG. 2A.

The drive member 68 is in turn connected to diametrically opposite sides of the support frame 42. For this purpose, the support frame 42 has a pair of brackets 76 fixedly mounted thereon at substantially diametrically opposite locations. These brackets 76, which are effectively aligned with the opposite ends of the annual axis 33, support thereon appropriate hinges or pivots 77 which are aligned along the axis 33 and pivotally join the reflector assembly to the drive member 68. Thus, when the drive member 68 is rotatably displaced about the polar axis 27, it accordingly causes a corresponding rotational displacement of the reflector 12 and target 13 assemblies about the polar axis.

To angularly displace the reflector and target assemblies about the annual axis 33 so as to compensate for seasonal elevational changes in the position of the sun, there is also provided a second drive mechanism 81 which coacts between the polar axle 26 and the support frame 42. This drive mechanism 81 includes a conventional linear drive motor 82, such as a motor-driven reversible rotatable screw arrangment used for causing linear displacement of a drive element 83, which element can be linearly displaced in a direction which extends substantially parallel with the polar axis 27. The drive element 83 is connected to the ends of a pair of drive cables 86 and 87 which extend outwardly in opposite directions from the drive element 83 substantially along the polar axle. The one drive cable 86 extends around a guide pulley 88 provided adjacent one end of the polar axle, with the other end of the drive cable 86 being suitably anchored to the lower mounting plate 41 at the point 89. In a similar manner, the other drive cable 87 extends around a further guide pulley 91 disposed adjacent the other end of the polar axle, and this cable is also suitably anchored to the lower mounting plate 41 at the point 92. The end portions of cables 86 and 87, in the vicinity of the anchor points 89 and 92, are suitably guided along an elongate curved guide channel 93.

These cables 86 and 87, due to their connection to the lower mounting plate 41 and the drive element 83, thus effectively form an endless loop such that, when the drive element 83 is linearly moved inwardly (rightwardly in FIG. 3), the drive cable 86 is tensioned and hence causes the reflector 12 and target 13 assemblies to swing clockwise about the axis 33. Similarly, when the drive element 83 is moved linearly outwardly (leftwardly in FIG. 3) the drive cable 87 is suitably tensioned and causes swinging of the reflector and target assemblies in a counterclockwise direction about the axis 33. In this manner, the reflector and target assemblies can be angularly adjusted on a seasonal basis to compensate for either the northernly or southernly elevational change in the position of the sun.

Figure 7:
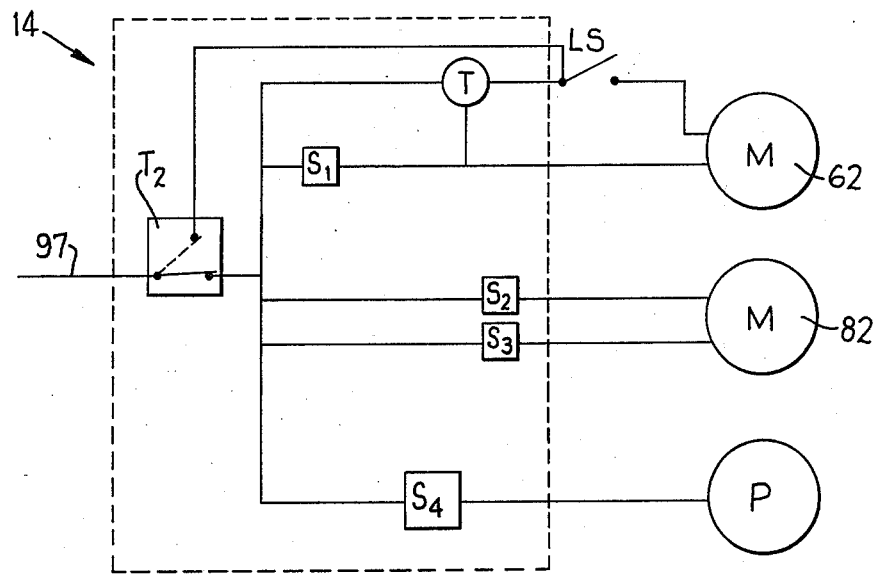
FIG. 7 schematically and diagrammatically illustrates the controls for the solar concentrator.

The control over the movement of the reflector 12 and target 13 assemblies, so as to permit proper tracking of same in accordance with the solar position, is effected by a control system 14 which is illustrated diagrammatically in FIG. 7. This system includes an electronic control unit 96 which has associated therewith several control elements for insuring proper activation and movement about the appropriate axes. For example, this control unit has several photosensors (such as phototransistors) associated therewith to enable the desired daily and annual tracking of the sun by the reflector. More specifically, there is provided a first sensor $S_1$ provided for sensing the sun's location and, when the reflector is not properly oriented in substantially perpendicular relationship to the sun's rays, then this sensor will activate appropriate circuitry so that electrical energy from the main supply 97 as controlled by a 24-hour timer $T_2$ (FIG. 7) can be provided to the motor 62 so as to energize same, thereby causing an incremental angular rotation of the reflector and target assemblies about the polar axis 27 until the reflector assembly is again properly positioned. In this manner, the sensor $S_1$ causes the reflector to continually track the sun on a daily basis from horizon to horizon. In addition, there is provided a suitable adjustable timer $T_1$ which also can control the energization of motor 62 to thereby control the daily tracking movement of the reflector about the axis 27. This timer $T_1$ causes the reflector to be moved in an intermittent steplike manner so as to approximately follow the estimated position of the sun during its daily travel. This timer will energize the motor 62 and control the tracking movement in those instances where the sensor $S_1$ is unable to control, such as when the sun is under a cloud or when the photosensor $S_1$ is in a shadow due to the surrounding frame formed by the dome 16. The timer $T_1$ causes the reflector to slowly track at a position where it slightly lags the normal position which would be assumed by the reflector when controlled by the sensor $S_1$ since, in this manner, the sensor $S_1$ can again control the tracking movement, either when the sun reappears, or when the sensor moves out from beneath the shadow. The separate 24-hour timer $T_2$ also is set so that, upon reaching a preselected time corresponding to sunset, it causes energization of motor 62 in the reverse direction so that the target and reflector assemblies are reversibly rotated back about the axis 27 into their original starting positions, at which position they contact limit switch LS which deactivates the motor. The system is then positioned so as to be activated again the next morning by timer $T_2$ when the sun again rises.

With respect to the seasonal elevational change in the solar position, the solar concentrator suitably adjusts for this positional change by the provision of sensors $S_2$ and $S_3$, which sensors again comprise conventional phototransistors, one sensor being provided for sensing a North positional change, and the other being provided for sensing a South positional change. When either of these sensors indicates either a northernly or southernly positional change in the sun, then the motor 82 is energized in the appropriate direction to effectively tension cable 86, whereupon the reflector 12 and target 13 assemblies are angularly tilted about the annual axis 33 through the desired amount. The control unit 96 also includes an additional sensor $S_4$, also a phototransistor, which is utilized for controlling the pump P which controls the circulation of heat transfer fluid through the target coil 53. This sensor $S_4$ senses when a sufficient level of solar energy is being directed against the reflector, and hence concentrated on the target coil, so as to thus activate the pump and effect the desired circulation of fluid through the target coil.

The solar sensors $S_1$, $S_2$, $S_3$ and $S_4$ are mounted so as to be movable with the reflector and target assemblies. For this purpose, the sensors are normally mounted above the reflector on a suitable support 98 which is fixed to, and projects outwardly from, the mast.

It will be appreciated that the control circuitry for controlling both the daily and annual tracking of the target and reflector assemblies may assume many variations, and that the design of such control circuitry is within the skill of those familiar with systems of this general type.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a solar concentrator having a stationary support frame, a dish-shaped reflector assembly movably supported on said frame for angular displacement about first and second substantially perpendicular axes, and first and second drive means interconnected to said reflector assembly for effecting angular displacement thereof relative to said frame about the respective first and second axes, comprising the improvement wherein:

said stationary support frame is an open ball-like framework formed as a geodesic dome, a support shaft extending substantially diametrically across the interior of said open framework and having the opposite ends thereof supported on said framework, said support shaft defining said first axis and being oriented to extend substantially parallel with the earth's north-south axis, support means hingedly supported on said support shaft substantially at the midpoint thereof for permitting angular displacement of said support means relative to said support shaft about said second axis, and said dish-shaped reflector assembly being surrounded by and entirely positioned within the interior of said ball-like framework and fixedly secured to said support means so as to be movable within said open framework.

2. A concentrator according to claim 1, wherein said first drive means includes a partial drive ring which is positioned within the interior of said open framework and is generated on a radius centered approximately on the first axis, said drive ring extending through an angle at least slightly in excess of 180°, said drive ring in the vicinity of the opposite free ends thereof being hingedly connected to said reflector assembly substantially at diametrically opposite points thereon, said hinged connections being substantially aligned with said second axis, means supporting said partial drive ring for movement within a plane which extends substantially diametrically of said framework and substantially perpendicular to said first axis, said first drive means also including reversible motor means interconnected to said partial drive ring for causing angular displacement of same about said first axis to cause corresponding angular displacement of said reflector assembly.

3. A concentrator according to claim 1, wherein said dish-shaped reflector assembly has a clearance slot formed therein along a substantially diametrically extending line to provide sufficient clearance to permit said support shaft to extend therethrough when said reflector assembly is tilted about said second axis.

4. A concentrator according to claim 1, wherein said open framework is formed from a plurality of elongated rodlike struts which are rigidly joined together and which define therebetween large regions which are wholly open.

5. A concentrator according to claim 4, wherein said open ball-like framework includes a plurality of interconnected structural triangles, each said triangle being formed from three of said rodlike struts which are rigidly joined together and define therebetween a large triangular region which is wholly open.

6. A concentrator according to any one of claims 1, 4 or 5, wherein the geodesic dome which defines said open balllike framework is constructed as an even-frequency icosahedron.

7. In a solar concentrator having a substantially stationary support frame, a dish-shaped reflector assembly movably supported on said frame for angular displacement about first and second substantially perpendicular axes, and first and second drive means interconnected to said reflector assembly for effecting angular displacement thereof relative to said frame about the respective first and second axes, comprising the improvement wherein:

said support frame is an open framework formed as a geodesic dome, said geodesic dome being constructed as a two frequency icosahedron with said open framework being formed from a plurality of interconnected structural triangles, each said structural triangle being formed from three rodlike struts which are rigidly joined together and define therebetween a triangular region which is wholly open, each said strut defining one of the sides of two adjacent triangles, all of the triangles forming said open framework being isosceles triangles, and all of the rodlike struts defining the triangles of said framework being of only two different lengths, a support shaft extending substantially diametrically across said dome and having the opposite ends thereof supported on said framework, said support shaft defining said first axis and being oriented to extend substantially parallel with the earth's north-south axis, support means hingedly supported on said support shaft substantially at the midpoint thereof for permitting angular displacement of said support means relative to said support shaft about said second axis, and said dish-shaped reflector assembly being positioned within the interior of said framework and fixedly secured to said support means.

8. A concentrator according to claim 7, wherein a mast is fixedly secured to said support means and projects therefrom in substantial alignment therewith, said mast projecting outwardly from the concave surface of the reflector assembly, and a target assembly mounted on said mast adjacent the free end thereof, said target assembly being positioned within the interior of said framework so as to be movable relative thereto about said first and second axes, said target assembly having means for permitting absorption of solar energy.

9. In a solar concentrator having a substantially stationary support frame, a dish-shaped reflector assembly movably supported on said frame for angular displacement about first and second substantially perpendicular axes, and first and second drive means interconnected to said reflector assembly for effecting angular displacement thereof relative to said frame about the respective first and second axes, comprising the improvement wherein:

said support frame is an open framework formed as a geodesic dome, a support shaft extending substantially diametrically across said dome and having the opposite ends thereof supported on said framework, said support shaft defining said first axis and being oriented to extend substantially parallel with the earth's north-south axis, support means hingedly supported on said support shaft substantially at the midpoint thereof for permitting angular displacement of said support means relative to said support shaft about said second axis, and said dish-shaped reflector assembly being positioned within the interior of said framework and fixedly secured to said support means;

said support means including a substantially central support column which projects perpendicularly from said second axis toward the open framework, said dish-shaped reflector assembly including a substantially dish-shaped support grid formed by a plurality of spars which are angularly spaced about said support column and project radially outwardly thereof, said spars having the radially inner ends thereof fixed to said central support column, and said reflector assembly also including a plurality of individual reflector members mounted on the concave side of said support grid, said plurality of reflector members defining a reflective surface having a substantially parabolic shape generated about an axis which effectively constitutes an extension of the longitudinal axis of said center support column.

10. A concentrator according to claim 9, wherein a mast is fixedly secured to and projects longitudinally of said support column, said mast being disposed on the side of said reflector assembly adjacent the concave surface thereof, and a target mounted on said mast adjacent the free end thereof for permitting the solar energy reflected from said reflector assembly to be concentrated thereon, said target being positioned within said open framework so as to be angularly movable relative thereto.

* * * * *